(12) United States Patent
Randle et al.

(10) Patent No.: US 8,020,196 B2
(45) Date of Patent: *Sep. 13, 2011

(54) SECURE TRANSMISSION AND EXCHANGE OF STANDARDIZED DATA

(76) Inventors: William M. Randle, Bexley, OH (US); Randall E. Orkis, Pataskala, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/505,475

(22) Filed: Jul. 18, 2009

(65) Prior Publication Data

US 2010/0064349 A1    Mar. 11, 2010

Related U.S. Application Data

(63) Continuation of application No. 10/459,694, filed on Jun. 11, 2003, now Pat. No. 7,568,222, which is a continuation of application No. 10/283,038, filed on Oct. 25, 2002, now Pat. No. 7,565,326.

(51) Int. Cl.
- *H04L 9/32* (2006.01)
- *H04L 9/00* (2006.01)
- *G06F 7/04* (2006.01)

(52) U.S. Cl. ........... 726/4; 726/5; 726/6; 726/7; 726/27; 726/28; 713/168; 713/169; 713/170; 713/171; 713/174

(58) Field of Classification Search ....................... 726/4
See application file for complete search history.

*Primary Examiner* — Longbit Chai
(74) *Attorney, Agent, or Firm* — Edwin M. Baranowski; Porter, Wright, Morris & Arthur, LLP

(57) ABSTRACT

Standardized transmission of digital data with trusted and untrusted connections by translating non-native requests and or non-native responses to and from a normalized format or to a format needed for processing the request and or response configured in hub and spoke, star, direct, peer to peer or hybrid connections. Encryption is provided at multiple layers to establish non-repudiation for a security service that integrates external security applications into a single service.

20 Claims, 12 Drawing Sheets

```xml
<?xml version="1.0" ?>
<IFX xmlns:com.ebancllc="http://www.ebancllc.com">
  <SignonRq>
    <com.ebancllc:SignonPswdInit>
      <SignonRole>Customer</SignonRole>
      <CustId>
        <SPName>Empowered National Bank</SPName>
        <CustLoginId>292-84-0947</CustLoginId>
      </CustId>
      <CustPswd>
        <CryptType>None</CryptType>
        <Pswd>1234</Pswd>
      </CustPswd>
      <GenSessKey>1</GenSessKey>
    </com.ebancllc:SignonPswdInit>
    <ClientDt>20010220152355738</ClientDt>
    <CustLangPref>EN-US</CustLangPref>
    <ClientApp>
      <Org>Corillian</Org>
      <Name>Voyager</Name>
      <Version>1.0</Version>
    </ClientApp>
  </SignonRq>
  <BaseSvcRq>
    <CustIdInqRq>
      <CustLoginId>292-84-0947</CustLoginId>
    </CustIdInqRq>
  </BaseSvcRq>
</IFX>
```

*Figure 7*

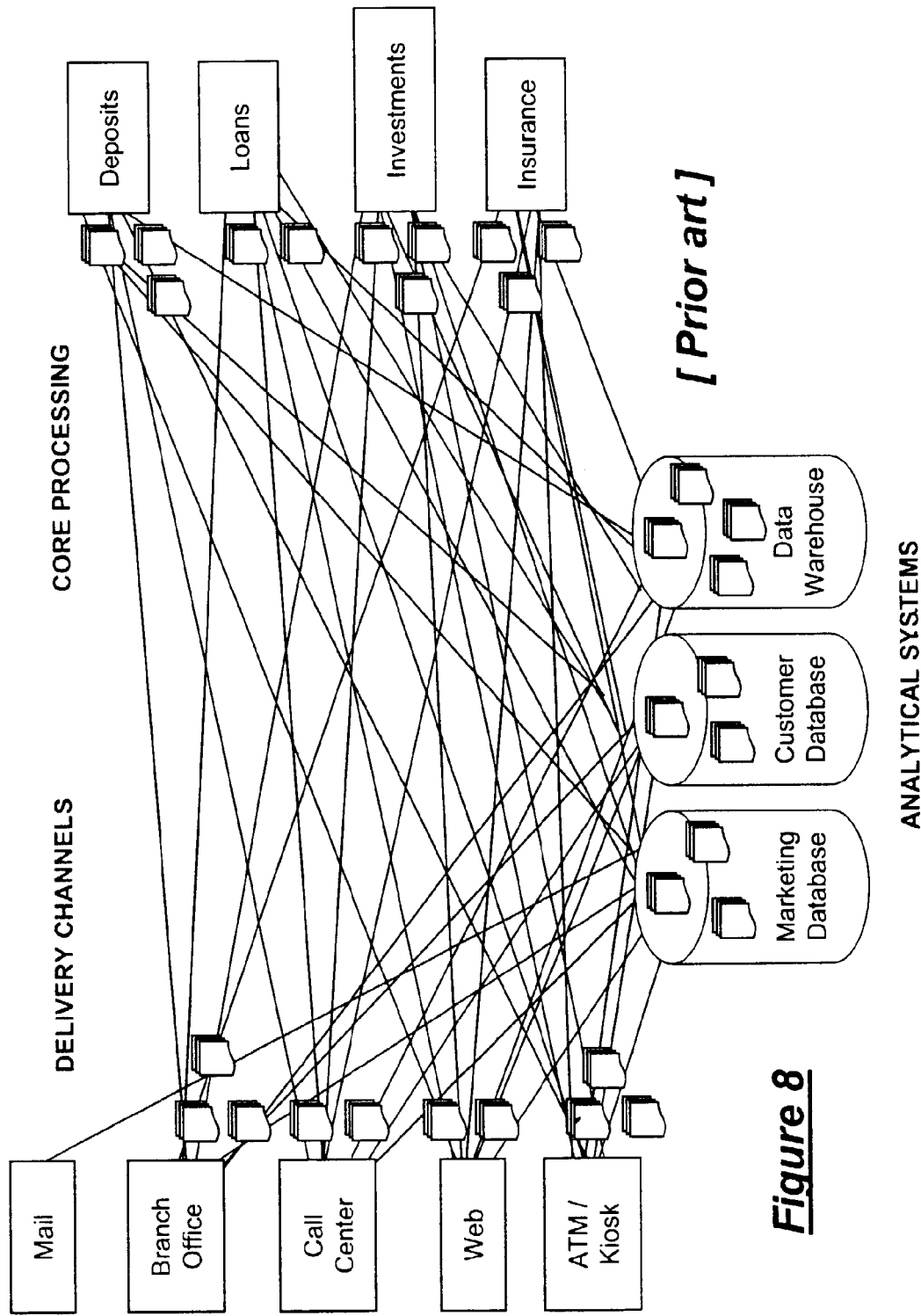
*Figure 8* [Prior art]

SECURE TRANSMISSION AND EXCHANGE OF STANDARDIZED DATA

CROSS-REFERENCE TO RELATED APPLICATIONS

This application is a continuation of co-pending applications U.S. Ser. No. 10/283,038 filed on Oct. 25, 2002, DIALECT INDEPENDENT MULTI-DIMENSIONAL INTEGRATOR USING A NORMALIZED LANGUAGE PLATFORM AND SECURE CONTROLLED ACCESS, and U.S. Ser. No. 10/459,694, STANDARDIZED TRANSMISSION AND EXCHANGE OF DATA WITH SECURITY AND NON-REPUDIATION FUNCTIONS filed on Jun. 11, 2003.

FIELD OF THE INVENTION

The present invention relates to secure electronic information transfer and exchange between and among institutions and/or systems. In particular, the present invention relates to a system for integrating authentication and/or authorization activities and protocols across a wide range of channels, devices, and exchange services.

BACKGROUND OF THE INVENTION

Electronic information exchange methods are a standard means for the transfer of information. Electronic transfer methods, such as Electronic Data Interchange (EDI), computer readable media, e-mail, World Wide Web (www.address), File Transfer Protocol (FTP), Internet Relay Chat (IRC), and the like, may be accessed in a variety of methods and means, including wired as well as wireless access. The transfer of information electronically creates the potential for unauthorized eavesdropping or unauthorized access on the exchange. To protect information and prevent unauthorized access and use of information, most providers employ security procedures for authentication and/or authorization. Security procedures may be in the form of a sign-on protocol that requires a user name and password or other digital security object prior to the exchange of information. Information protected by authentication and authorization protocols may further include encryption to deter unauthorized access and use and provide for the secure communication of information.

The present invention relates to an enterprise business integration engine having secure access adapted to uses in relationship management, merger and acquisition integration, operational risk management and performance management. The invention overcomes problems in the prior art associated with market change, competition, consumer preferences, regulatory changes and disjointed information architecture in legacy systems.

Industry offers a broad range of electronic applications for services over a broad range of networks, channels and devices. Entities use electronic transfer mechanisms for multiple accounts; personal users perform electronic inquiries and reports. The need for security in the transfer of information is paramount. No prior system offers users a comprehensive solution to access and exchange secure information to and from disparate and/or unrelated sources. Security in the exchange of information also impedes interaction between legacy and new systems. In order to insure the secure delivery of services, providers of information and exchange services require users to complete new identification information so that a user must use separate access protocols in order to use a new version of a given existing application. The multitude of incompatible authentication and authorization protocols mandates that consumers of electronic services perform numerous sign-on procedures. Each authentication and/or authorization procedure service requires the retention of separate passwords or other digital security objects. As a result, the electronic exchange of information requires authorization and/or authentication to multiple security systems producing incompatibilities and delays in exchanges between and among users. Security protocols also include varying levels of access and authorization for a user of electronic information and exchanges. Existing systems are not integrated, and actually work to prevent integration of access and authorization across systems by employing credentialing or identification mechanisms that are specific only to that system. The specific mechanisms require protocols that reflect various system-specific policy rules and activities that may not be compatible with other systems or technologies.

In the prior art, a lack of enterprise application architecture scatters data and business logic. For example, data files relating to relationship, demographics, accounts, transactions, behavior, history, and analysis are often scattered and inaccessible from one legacy system to another. Complicated and expensive connectivity systems have been proposed to resolve these issues; however, prior solutions have a negative impact on key business initiatives such as relationship management, merger and acquisition integration, performance management, and operational risk management. Prior art deployment stratagems for an information integration hub have been elusive. To build is expensive and risky, involving projected costs of $50 Million to $75 Million and a projected timeframe of from 24 to 36 months before value is achieved. High risk and high cost are associated with lack of experience and resource constraints and existing channel software or middleware may present a high risk to stretch a product past design. Namely there are too many pieces to try to put together. Hence, the scope and risk of an integration project has hindered attempts at solving the data integration problem in the financial industry and there are numerous universal adapters for core systems and delivery channels which have proven unsatisfactory.

Channels perform authentication either at the channel (using a trusted connection to other systems) or use an external or host-based (untrusted connection to the device or system that is providing authentication, and/or authorization) security. The disparity of trusted or untrusted systems among channels, devices, and services severely limits a uniform system for secure transactions. As an example, a trusted security pathway compares a user's credentials to information stored on the master system. If systems are to be integrated, trusted and untrusted channels have a need to proxy security to another entity. This may be required when credentials are presented and must be checked prior to allowing a user to access information across disparate systems. Channels may also provide a reference to a session or activity context that can be tied to the credential(s) presented by a device, system, person or channel. In order for a channel to perform exchanges between individual services, such as an application that includes remote terminal access and a smart card, the individual authorization and authentication protocols for each of those services require a user to submit multiple user IDs and passwords in order to perform inquiries and communications among and between services and/or systems.

A need exists for a system that integrates authentication and/or authorization protocols and various encryption schemes required for independent services that determines a device, person, channel or system's relationship to a given service, the objects among the channels and exchange options allowed, and the level of access allowed for each device, person, channel, system, service, and exchange. An integrated security solution provides a flexible service and is desirable to save time and resources. No existing system in the prior art adapts easily for use with all services, devices, and delivery channels with multiple credential storage systems or encryption schemes.

BRIEF SUMMARY OF THE INVENTION

The present invention provides for the integration of authorization and/or authentication protocols across entities, channels, devices, for both new and legacy systems while supporting encrypted and unencrypted connections and interfaces. The present invention aggregates and consolidates multiple security systems and credential storage approaches into a seamless system from the user, device and interface perspective and provides a security integrator capable of aggregating and consolidating authentication and/or authorization protocols performed by multiple related or indirectly related channels and systems. Use of the invention allows existing systems to be leveraged with other systems as needed by providing a single service and management system for use in multiple disparate security systems.

The present invention provides the ability to integrate authentication and/or authorization protocols and various levels of encryption required in response to any given request associated with related or nonrelated services, devices, and channels. The present invention provides a universal and logical exchange of information concerning authentication and/or authorization with little impact on the transaction, information, channel or service. The present invention provides for efficiency in the elimination of repeated user sign-ons for authentication and/or authorization and the need for an individual or system specific service for each new and legacy credential or credential management scheme.

Any normalized language may be used to perform the functions of the present invention. In the preferred embodiment, Extensible Markup Language (XML) is used to deliver a message containing a request for authentication and/or authorization. The preferred embodiment uses XML constructs to associate session context with a particular channel to a session key linked to a user and the context of services and/or information requested by the user, or an object associated with a session exchange between parties desired to be identified during a particular session. The invention integrates authentication and authorization in multiple varieties of transactions, identification protocols, and exchanges. The preferred embodiment of the invention is directed to electronic information exchanges. It is thus an object of the invention to fill a long felt need for an information integration hub and to provide enterprise-wide comprehensive customer information and interaction capabilities for all delivery channels in a unified and centralized process, with business rules and data specific to business sector requirements. The system is standards based, open for ease of integration and operation, agile and flexible, quick to implement to realize business goals, scalable, and allows high transaction throughput required by an enterprise-class, mission critical solution. The system is reliable and secure, provides accurate and auditable customer transaction processing, and the system integration provided is nonintrusive and minimizes impacts on existing systems. Deployment may be incremental and in manageable phases.

In an embodiment, the system is useful with an adapter that enables universal access to the enterprise aggregator hub and is noninvasive to existing systems. An object processor, which is a document processor, handles IFX sign on processing, creates and maintains session context, role and rules-based authorization, decomposes XML documents into messages and invokes appropriate message processors for each message in the document. Message processors send and receive business management routine (BMR) requests and compose response messages and processors assemble response messages into completed XML response documents. The object is transported and a service provider routes requests internally and externally. A comprehensive system management process results allowing a complete audit trail of all interactions, comprehensive balance and controls, configurable settings, SNMP support, comprehensive monitoring capability, and regulatory compliance and reporting.

The system facilitates the access and distribution of information across an enterprise (or multiple disparate networks) and enables integration of all current systems through a noninvasive adapter. A schema-based document processor supports XML semantic representations such as IFX and EBXML and provides location independent communication between components (location transparency). Enterprise logging ensures that application metrics, errors, audit, and trace information are reliably available. The system, a logical model of enterprise information aggregation, is a foundation for reuse and business value and a key component for providing consistent information to all channels. The adapter can uniquely interface to trusted and un-trusted devices or channels. This is unique in the market.

An information aggregator is provided in which identification, authorization and authentication information is related to multiple credentials in potentially different formats or dialects allowing access to information or transactions dependent on the user, the device used at an access point, the request made or activity involved, and the service provider. A multitude of credentials can be established for numerous activities and users. For example, in an authentication process at a terminal, a user inserts a card and enters a PIN comprising the data transmitted in the network accessed to the integrator. The card and PIN data validate the user as registered in the hub system or through a look up in another system, as registered therein. Hence, the authorization may be internal or external. Once validated, a permitted activity is available to the verified user dependent upon criteria associated with the identity and device (authorization) and the activity is then executed by a service provider through the hub.

A log on protocol is provided that eliminates the one to one look up correlation associated with prior art systems. Based upon the user, the identity security (PIN, password, biometric, etc.) and the device (home personal computer, enterprise terminal, telephone, PDA, cell phone, remote log on, etc.) and location (headquarters, branch office, remote, etc.), the services and activities available to a user can be determined from a factorial range of alternatives determinant of an authenticated user's authority to participate in a particular data inquiry or activity.

In the description of the preferred embodiment herein: (1) "user" includes, but is not limited to, an entity or individual and parties acting on their behalf, parties in exchanges between institutions and customers, clients, account holders, creditors and debtors, institutions and their service providers, institutions and other institutions, and merchants and customers. "User" can be any kind of identifiable entity; human, machine, process and the like; (2) "institutions" refers not only to traditional constituents, but also to financial firms, auditing companies, insurance companies, car dealers, and credit bureaus, namely, any business, firm or person accessing or providing client or institutional information or services; (3) "message" is a collection of data fields sent or received together between software applications, systems, or networks containing control information and content; (4) "mechanisms associated with a request" include, but are not limited to financial transactions and any other device used to initiate a transaction exchange and/or information query, information exchanges to and from government instrumentalities in both wired and wireless transactions; (5) "communication mechanisms" of the request include verbal, audible, optic, written, imaged, and the like, both wired and wireless, and analog and digital; (6) "channels" include both wired and wireless devices, digital and analog, directly and through a network, designed to enable access, such as card readers, terminals, telephones and voice units, VRUs, pagers, cable television, PDAs, PCs, vending machines, lock box processing, business or government computer systems and networks, and devices and the like, as well as mechanisms to enable access at a point of service; (7) "credential" is a set of information, which is used by a user to establish an electronic identity to a computer system as part of an authentication and or authorization protocol. A credential may be associated with ancillary information supporting a user's right to possess that credential (such as a PIN or private signing key). Examples of credentials include, but are not limited to, user identifiers, passwords, PIN numbers, account numbers or information, digital certificates, PKI standards, biometrics, other object security devices, and the like; (8) "determinate" means an algorithm, formula, service, program, programmatic call, and the like. The preferred embodiment complements the existing information systems infrastructure, providing convenience, versatility, enhanced security and fraud detection. (9) "value" herein includes information, data and the like, also having value to a user in the scheme herein.

A benefit of the invention is the ability to allow a user to employ a service that can act in a single sign-on or multiple sign-on capacity for access to a multitude of resources. Additionally, when a change or update is made to information associated with a user or specific activity, the change can be made across systems and services linked to the invention, thus providing a means to synchronize a change of information across any or all channels and services employed by that user and/or institution linked to the system. The present invention also reduces administrative overhead by integrating services, credential storage, and interfaces to other services or entities to provide a seamless service view to the user over multiple related or nonrelated channels. The present invention allows a user to use existing credential systems while providing a path to new objects or systems with reduced impact to the user, channel, device, or service as compared to current approaches.

The interoperability of the present invention includes, but is not limited to, providing 1) a standard method for transmitting data between a customer, a store and one or more institution, and, 2) standard security mechanisms for authorization, authentication, secure communications, and non-repudiation in the transmissions. Specifically, the system of the present invention comprises formatting an electronic request for transfer between individuals and organizations, translating data into an object that can be sent between non-affiliated organizations; construction of code, such as, but not limited to, digital signatures, and secure transmission of objects over a network.

BRIEF DESCRIPTION OF THE SEVERAL VIEWS OF THE DRAWING

FIG. 7 is a message example.
FIG. 8 shows the point to point connectivity requirements in prior art interconnection methods when disparate networks and or systems are attempted to be connected.

DETAILED DESCRIPTION OF THE INVENTION

Figure 1A:
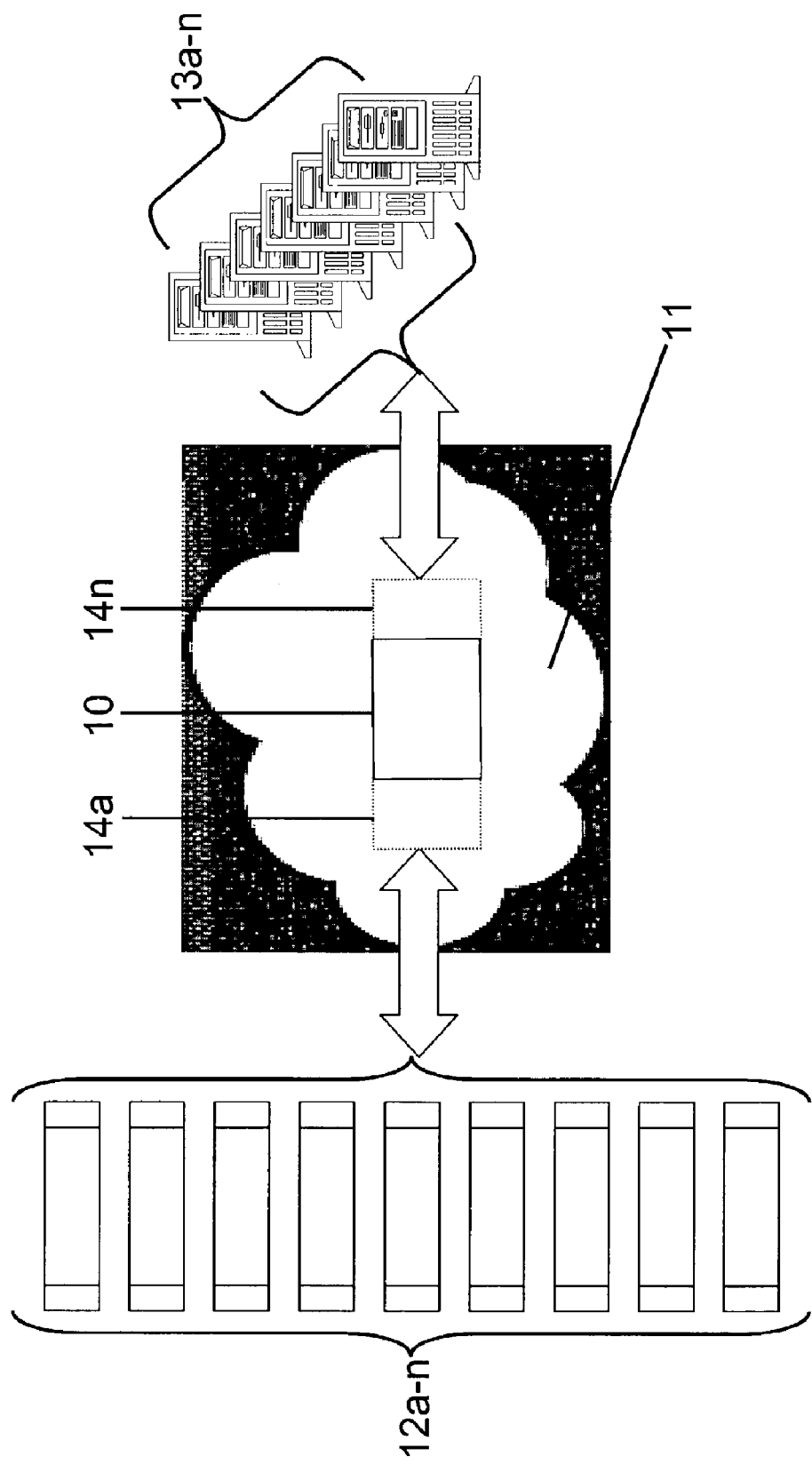
FIG. 1A is a schematic overview of the invention.
Figure 1B:
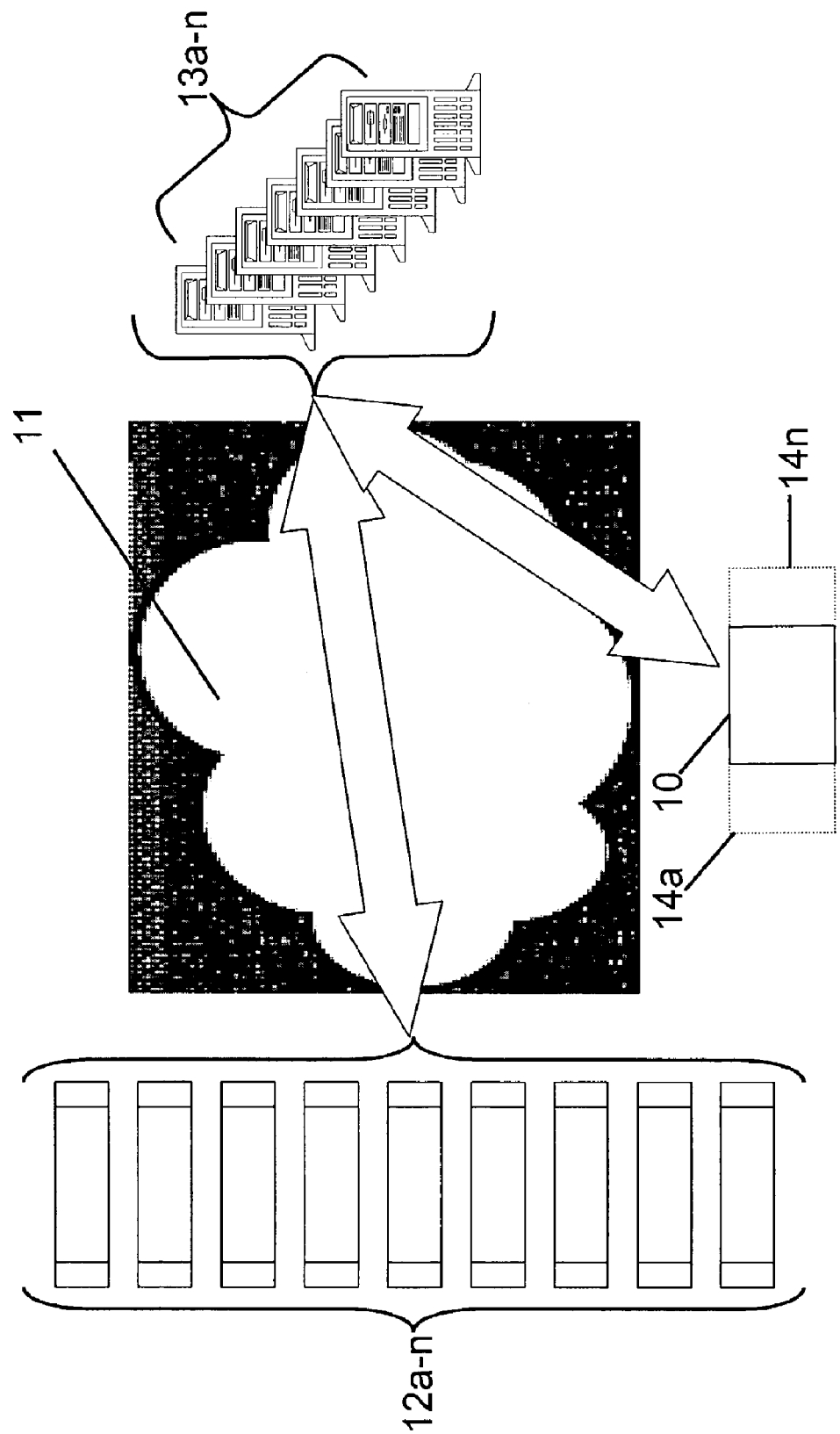
FIG. 1B is an alternate embodiment of an overview of the invention.

The present invention provides for the integration of related and nonrelated channels, devices and services. FIG. 1A shows an overview of the present invention. The invention comprises an integrator 10 in contact through a network 11 with at least one user having a relationship with the integrator 10 or a relationship with another user or entity that is connected to the integrator. The user may be associated with one or more channels or institutions 12a-n (which may optionally be used by an end user), or the user may be a destination in a plurality of destinations 13a-n, as shown in FIG. 1B. In the preferred embodiment, the user is an institution and the network is the Internet. The system may be accessed using both wired and wireless means.

The system may include one or more adapter 14a-n optionally linked to one or more than one channel 12a-n, one or more than one destination 13a-n, and/or to the integrator 10. The adapter 14 translates a message from a channel 12 into a normalized language or dialect for use across the system. The adapter 14 provides external devices with an interface to normalized format in a model driven architecture (MDA) rather than an interface driven architecture. The adapter 14 uses a model driven solution to interface non-intrusively to an existing point to point architecture. The architecture is driven by the model rather than overcome by the existing interfaces. As a result, value is achieved in terms of re-use and supportability. The MDA of the present invention consists of a platform-independent model plus one or more platform-specific model and interface definition set, each describing how the base model is implemented. Using the present invention, functionality and behavior are modeled only once. As new applications are built, interoperability with other services is designed into the present system. The present invention automatically builds the necessary connections to bridge various platforms from an application to needed services and facilities and to other applications.

The adapter 14 translates non-native device requests and responses to and from the normalized format or to any format that is needed for processing. The preferred format is XML, although any suitable format may be used. The system can integrate to any device or system in an IT processing environment and significantly impact the level of re-use and cost to support a given implementation as the number of interfaces increases. In addition to translation, the adapter 14 supports security for session management and session proxy. The adapter 14 can uniquely interface to trusted and un-trusted devices or channels.

Features supported by the adapter 14 include transport, wire protocol, or communication protocol translation and manipulation; data payload, packet or envelope translation or manipulation; data or interface semantic translation or manipulation; client side or server side configuration for non-invasive integration to existing systems; security functions needed to support trusted and non-trusted devices, including session, logging, and session proxy; local and central storage of critical items like session and logging; high availability support to include clustering and fail over mechanisms for all functions in the adapter, including items such as but not limited to, adapter session affinity and the ability to store and manipulate translations in terms of meta data; ability to generate code for the creation of translator objects from meta data; the ability to utilize the output from a Graphic User Interface (GUI) mapping tool to generate translators; and other protocols.

Table I lists sample functions and associated values of the channel adapter of the present invention:

TABLE I

| Function | Value |
| --- | --- |
| Communication protocol conversion. | Provides the ability for a delivery channel that communicates via a different protocol to communicate with the platform. |
| Proxy for the channel device. | Enable a channel device to be integrated into the environment without changing the device's communication infrastructure. This includes security around session management and trusted and non-trusted interfaces. |
| Convert channel specific syntax and encoding to and from the equivalent XML representations. | Enable a channel device to be integrated into the environment without changing the data representations and encoding used. |
| Translate channel specific semantics to XML functionality | Allows a channel to access business functionality with its native message protocol. |
| Generate and Map session associated with an interface to a logical session. | Ties activity to action and to various security elements to include authorization, authentication, and non-repudiation. Provides one mechanism for the creation and management of processing. |
| Assign unique identifiers to each document and message to be processed. | Allows tracking of documents and messages as they flow through the system. Necessary for adequate auditing and logging. |

Figure 2A:
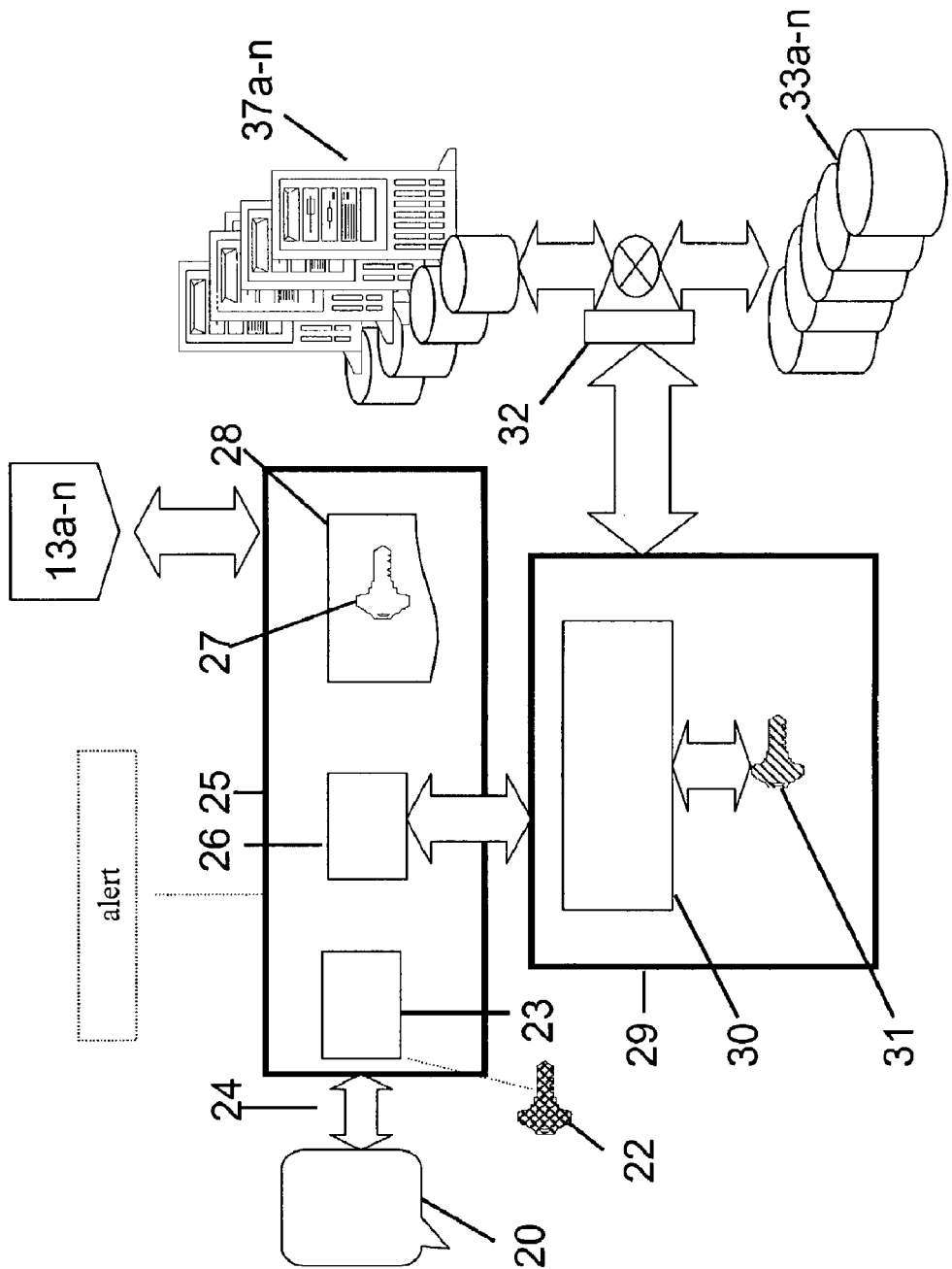
FIG. 2A is a schematic overview of a user interfacing with the invention.
Figure 2B:
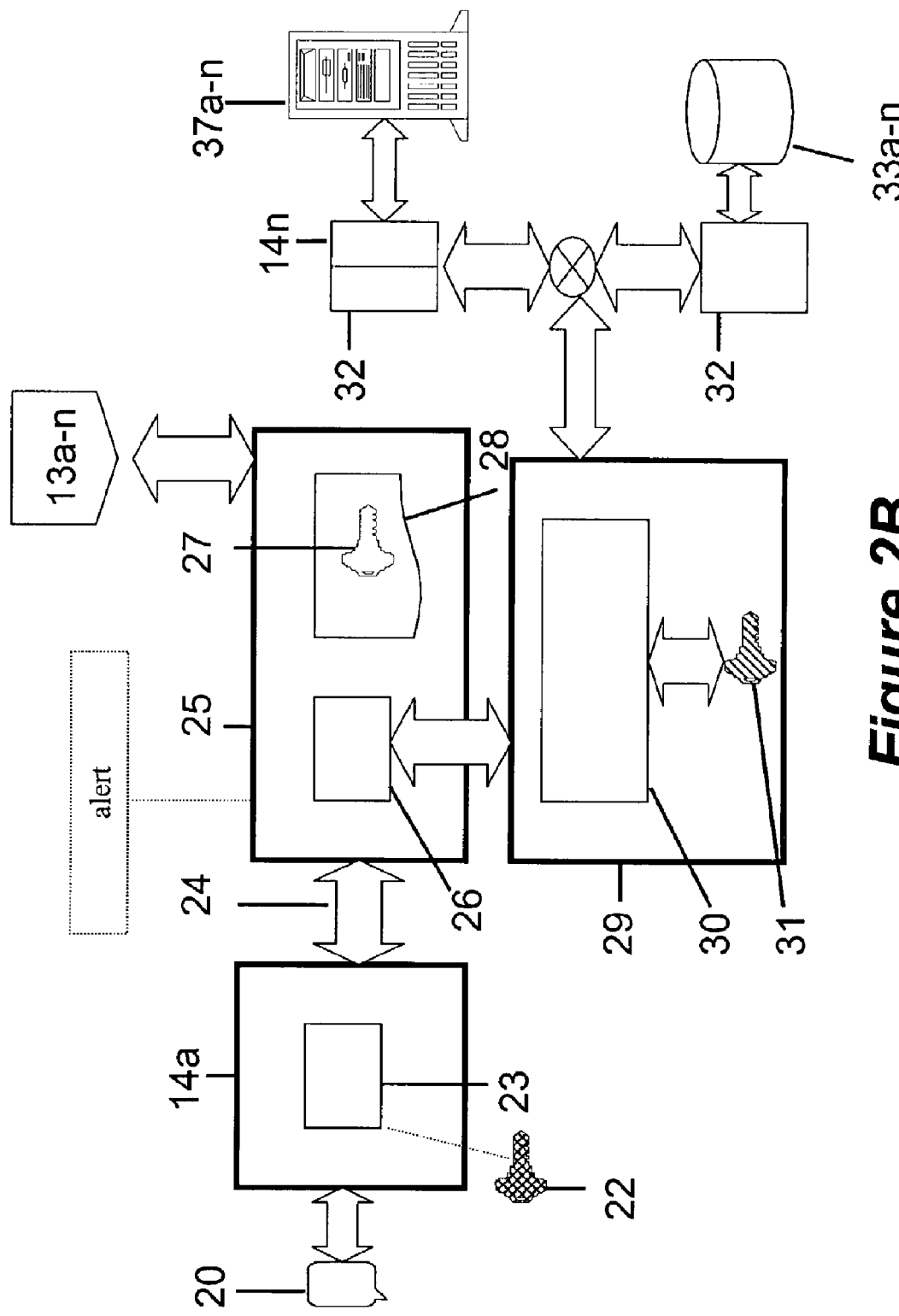
FIG. 2B is a schematic overview of an alternate embodiment of a user interfacing with the invention.
Figure 3:
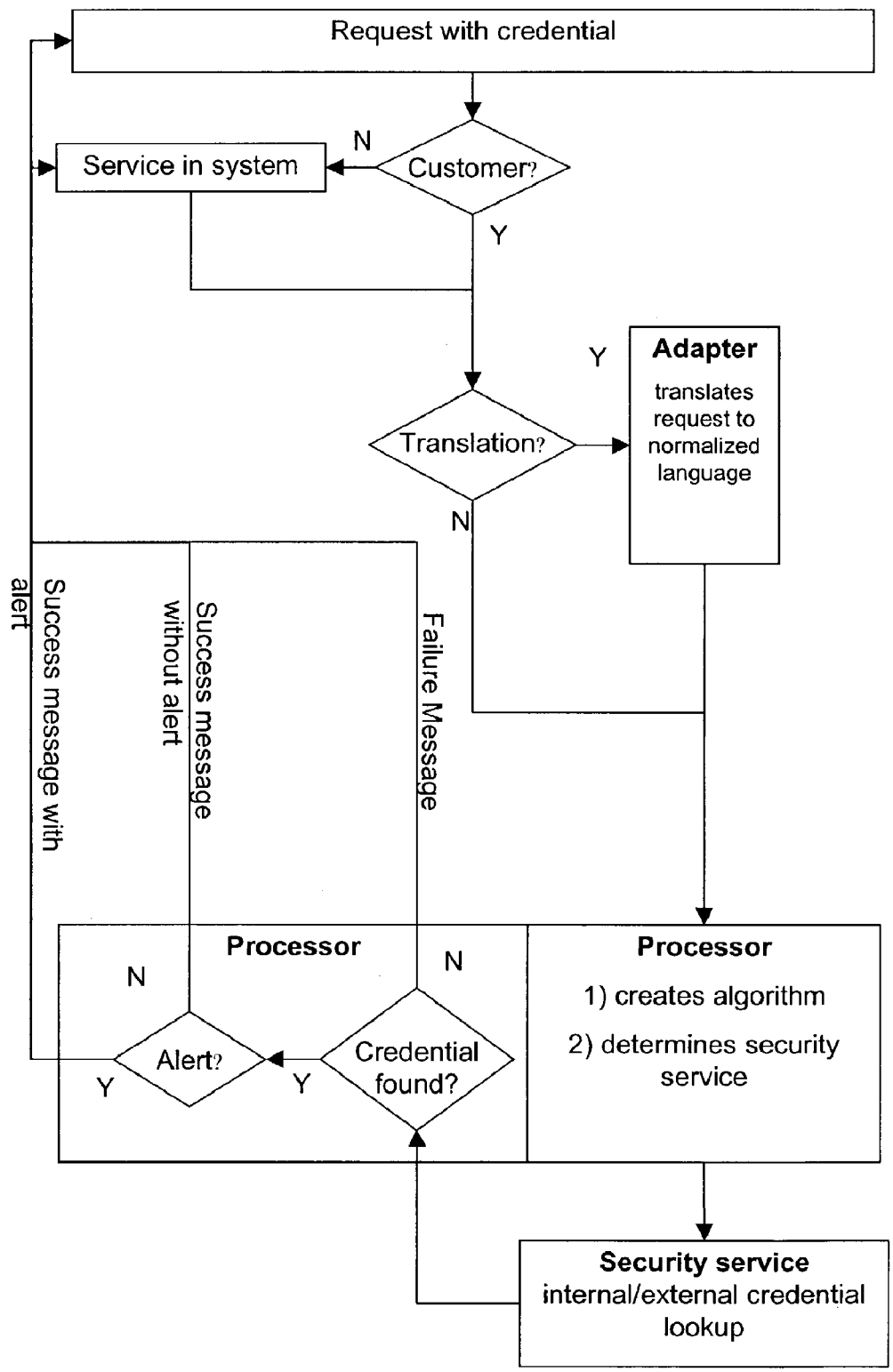
FIG. 3 is flow chart of the invention.

FIGS. 2A and 2B are schematic depictions of the invention processing a request by a user. The user initiates a request in the form of a message 20 through a channel 12*a-n*. The message 20 includes information, such as a sign-on protocol 43 (See FIG. 4) necessary for a request requiring authentication, authorization, or a combination, and may include additional information, such as a credential, encryption tag, process ID, or program for encrypting data or for data encapsulation via an encryption envelope.

As an example, a message in the preferred embodiment would include the name of the request, such as a request for authentication; the name of a request component, such as the type of channel 12, a terminal; an element of the request containing data, such as user ID; and the name of a simple business request within a service, such as an account balance inquiry. When the message 20 is composed in a nonstandardized language, the adapter 14*a-n* translates the message 20 to a normalized language, such as XML in the preferred embodiment. The elements of a request are standardized so that applications to be performed by the destination 13*a-n* may expect specific semantic requirements. For example, business requests may be qualified into service groupings based on a specific semantic, such as IFX in the preferred embodiment. Groupings may be offered by a given destination 13*a-n* designating a particular request, such as "check balance."

FIG. 2A depicts the receipt of a message 20 composed in a normalized language. The message 20 is received by a processor 25, which coordinates a channel device session identification look-up 22 and creates a session cache entry 23. The processor 25 decodes the message 20. Based upon the content of the message 20 and/or any mix of the following: the particular channel 12*a-n*, the request contained in the message 20 made by a user using that channel 12*a-n*, the services provided from that channel 12*a-n*, the owner of the channel 12*a-n* or family of service providers that it belongs to, the credential presented and/or required for authentication and/or authorization of a user using that channel 12*a-n*, and the language and/or interface of the destination 13*a-n* of the user's request contained in the message 20, is recognized.

Before processing the content of the message 20, if the message is from an untrusted channel, the sign-on information is validated as shown the Figures. After any required translation by the adapter 14, the processor 25 determines and executes a determinate. The determinate is used to determine the security service 29 used to validate the sign-on information contained in the message 20. Validation is performed by a multidimensional decision process that may include the comparison of sign-on information contained in the message 20 to data, such as a reference table or corresponding determinate that includes specific information associated with the user, including passwords, biometrics, codes, and the like, stored either internally or externally at the security service 29. Validation may also be based on confirmation of role and/or rules associated with the user, device or channel. If no verification is attained, a denial is sent back to the processor 25, which relays the denial to the channel 12, which may prompt the user to retry the sign-on protocol or request additional identifying information, such as a preset answer to a question.

Referring to FIG. 2A, on a positive response to the sign-on validation process 26, the system generates a session key 27. The session key 27 is used to create a session object 28 that holds information about the user, including sign-on and channel session context, to bind channel 12 activity with the execution of the request and a given user or entity associated with a user or group of users. The information held may be used for subsequent message processing. The system maintains the session 28 with the user at the channel 12 using a unique session ID until the user closes the session 28 or some idle time-out occurs. The processor 25 destroys the session 28 when the session expires or is abandoned. The information concerning the session and all interactions are logged for auditing and reports.

In the preferred embodiment, when the session 28 is established, a service profile is created listing valid items, requests, and/or services that may be contained in a message 20 and/or executed by the user and/or device making the request. The service profile corresponds to a profile 40 (See FIG. 4) listing products, accounts, services, and so on, available for that user at a given destination 13a-n. Further access control may be applied based on core elements included in the message 20 or on file profiles for service providers and the like.

In an embodiment of the invention, the processor 25 transmits the decoded message to a security service 29. The security service 29, which may be internal or external, interprets the decoded message through the appropriate BMR 30 and establishes a BMR session key 31. Each BMR can execute in parallel. A data management routine (DMR) 32 is used to compare channel credentials optionally centrally stored and managed by the system 33, or obtained from remote servers, databases, or systems 37, which may include the destination 13. The DMR 32 integrates nonrelated systems for use by the system. The DMR 32 and the adapter 14 can support Federal Data Encryption Standards (DES) and crypt password encryption as well as other algorithms and other such instruments for secure data manipulation and transmission. The DMR 32 may be configured to store and retrieve credentials managed by other systems or to perform the authentication management functions (enroll user, create credential, expire password, etc.). The processor 25 then formats the decoded message and sends the formatted message to the destination 13a-n for processing. The destination's response to the message can be encrypted and returned through the appropriate channel 12a-n to the user. Should no credential be found for the user, the processor 25 sends a reply denying the request to the user. Each interaction is logged for auditing and reporting.

FIG. 2B depicts the use of an adapter 14 to translate a message 20 received in a channel's 12 native format. The adapter 14 coordinates a channel device session identification look-up 22 and creates a session cache entry 23 with unique identifiers to each message in order to proxy and manages a session. The unique identifiers allow tracking of a given message as it flows through the system. The session cache entry may be used for subsequent message processing; in the case of the failure of adapter 14a, a back-up adapter 14n may continue the session. The unique identifiers are logged for reports and audits. In the preferred embodiment, the adapter 14 comprises software capable of translating and standardizing a semantic, data format, transport, and/or wire protocol of an input signal such as the channel message 20 and communicating the message 20 to a variety of destinations 13a-n. The adapter 14 of the preferred embodiment further uses an XML format to encode the message 20. The adapter 14 then transmits the translated message 24 to the processor 25. Before processing the content of the translated message 24, the sign-on information is validated and a session cache established similar to that described above for the embodiment not requiring the adapter. After validation, the processor 25 formats the message and sends the formatted message to the adapter 14 or to a second adapter 14n. The adapter 14 or second adapter 14n translates the formatted translated message into a format understood by the destination 13a-n for processing. The destination's response to the message can be encrypted when returned to the user. All interactions are logged and journaling is also supported.

Session is related to, and is a critical element of, security. In the system of the present invention, a unique session object or key is created that allows use of external and internal security applications, which allows the system to switch among many security applications based on elements in a given request or activity. The present invention provides a universal service for security that provides a path to single sign-on. By using a unique session, a link is created to all systems interactions for a given session key that can be tied to logging, journaling, and error reporting to provide for non-repudiation.

Non-repudiation requires that neither the sender nor the receiver of a message is able to deny the transmission. In many transactions, symmetric encryption is normally used (i.e., keys are shared by the provider institution and the customer). Symmetrical encryption has the disadvantage in that each party knows the key and can claim that a transmission was sent unilaterally. The present invention does not reveal the private key used by the customer in delivering a message to the institution. Likewise, the customer does not know the public-key created by the invention for the institution to deliver a message to the customer.

The unique session allows the present invention to recreate or log all activities associated with a given dialog. Session can be linked to many routines, which are user configurable. As an example, the unique session can be tied to a device, a user, if authenticated, an activity, a request and/or a response, internal or external systems or modules, and the like. Session ties can include a base application or a security infrastructure supporting many applications internal and external to the solution.

Session can be used to leverage existing security applications. Leveraging can be accomplished by generating a session key for use by another system or application, generating a session key that acts as a proxy to another system or application, or by generating a session key to be used for internal security applications or systems.

The session manager is responsible for maintaining the contextual information associated with channel interaction, the internal processing of the system and the external system or systems of record for the institution or service provider (Session Context). Session Context represents a logical connection between a user and/or one or more user device, system and/or interaction that a user has with a given service provider. Session Context includes information such as, but not limited to, channel device ID, session key, service provider ID, authentication information, any other information that must be maintained for the duration of a user connection, and the like. Sessions are managed by a session manager using session objects to contain the contextual data. The session manager provides a level of security context for all interface points and uniquely links one or more system interface points to one or more internal or external security applications or credential storage facilities. The session manager is used to link one or more request and response to create a unique log of the entire customer dialog with the system. Session objects or Session Context is used to create a map between the external connection ID, if it exists, and the session key generated by the system. If the external systems does not generate or expose a specific connection ID, a user can define one at the interface level. The connection ID provides a means to proxy session or Session Context with one or more application or device at various interface points and supports the reporting and logging through those interface points for a specific dialog or interaction.

The present invention interfaces to trusted and un-trusted devices, channels, or interface points and manages the interface in the context of session for security and logging events. The system allows for activities such as reporting, non-repudiation, and the ability to leverage external security applications for authentication and authorization. The adapter 14 may use session objects to validate subsequent interactions with a channel device or interface point. Validation allows for various levels of authorization based on a variety of factors that may or may not be part of the authentication application or credential storage/management vehicle. Alternatively, an authorization path may be coded into the session key using various algorithms. Authorization is managed at various levels to include, but not limited to, user, device, request or action, system interface, response, and the like.

The adapter has the ability to cache session object for performance reasons. Valid session objects may be stored in a central location to support fail over in the event of the loss of an adapter. The adapter has the ability to manage session through its local cache or by seeking the central location for session as needed. Cache may include information concerning role and rules associated with a given session. Session allows all interactions to be linked together so that the entire dialog can be managed in both real time and off line for reporting and security.

Table II charts sample functions and associated values of the session manager of the present invention:

TABLE II

| Function | Value |
| --- | --- |
| Manages a logical representation of customer in context. | Enables tracking the sequence of events that occur within a session with a customer. |
| Maps external session ID to system internal session ID. | Allows adapters to determine reply destination, and optimize and secure communication with the channel device. |
| Maintains sign-on information. | Allows subsequent business message processing to make use of information carried in the sign-on portion of the initial request. |
| Maintains business information associated with the session such as "customer" and/or "SP profiles." | Allows simpler and better performing service implementations by eliminating the need to redundantly retrieve information necessary to process some business messages. Provides the basis for performing authorization of services according to customer relationships. |

By leveraging an existing credential store for authentication and, if needed, authorization, the invention has the ability to externalize session and proxy session with existing systems and security applications as well as internal system security and credential storage mechanism. The same service can be used with one or multiple internal stores. The present invention's security service has the ability to transition to one or more systems or applications among multiple internal and external security stores, roles and/or rules. The information used to transition among many applications includes but is not limited to: 1) request being made, 2) device request is being made from, 3) owner of the device making the request, 4) agent device, service provider or infrastructure making the request, 5) credential or security elements presented, and 6) the service provider and/or owner of the system or systems containing the information of record for the request.

A unique session key is created based on rights or privileges delegated to a given security application. To better illustrate this feature, the following example is offered to further describe the invention and is not to be construed as limiting the invention:

EXAMPLE I

A unique session key is a security application that allows a terminal or like channel to access customer, account, or systems related information. In this example, a terminal authenticates a user based on information stored on a terminal or smart card and a related PIN number known to be unique to the owner of the card. The combination of the card and PIN provides a level of authentication that the person presenting the card is the owner of the card and is therefore authorized to conduct business activities at the terminal.

The invention allows a user to add multiple levels of authentication to a request without the need to significantly alter the existing security application, such as that associated with the terminal in the preceding example. The present invention allows for the use of or transition to a given level or access control (such as that in the terminal example) at other interface points or security mechanism based on a defined set of rules and/or roles. The present invention has the ability to work in the reverse in allowing movement among multiple security applications for the same interface point.

The system of the present invention augments rights and privileges delegated to an existing or given security application. Augmentation is provided through session and or defined roles for a given activity, device, request, service provider, servicer and the like. Augmentation is accomplished in various ways to include one or more levels of authorization and the defined rules and roles for such levels. As such, any credential used in the present invention may be leveraged to include additional security measures, such as, but not limited to, biometrics, digital certificates, smart cards, and the like.

The present invention establishes non-repudiation for a security service that integrates and/or aggregates external security applications into a single service that can provide authentication and/or authorization. In the overall system, the adapter proxies a session to an external session; maps or proxies a session to one or more external data element, tag, or user defined item; generates session for use by an external system; generates an ID unique to a given request; and generates an ID unique to a given response and/or associated request.

Figure 4:
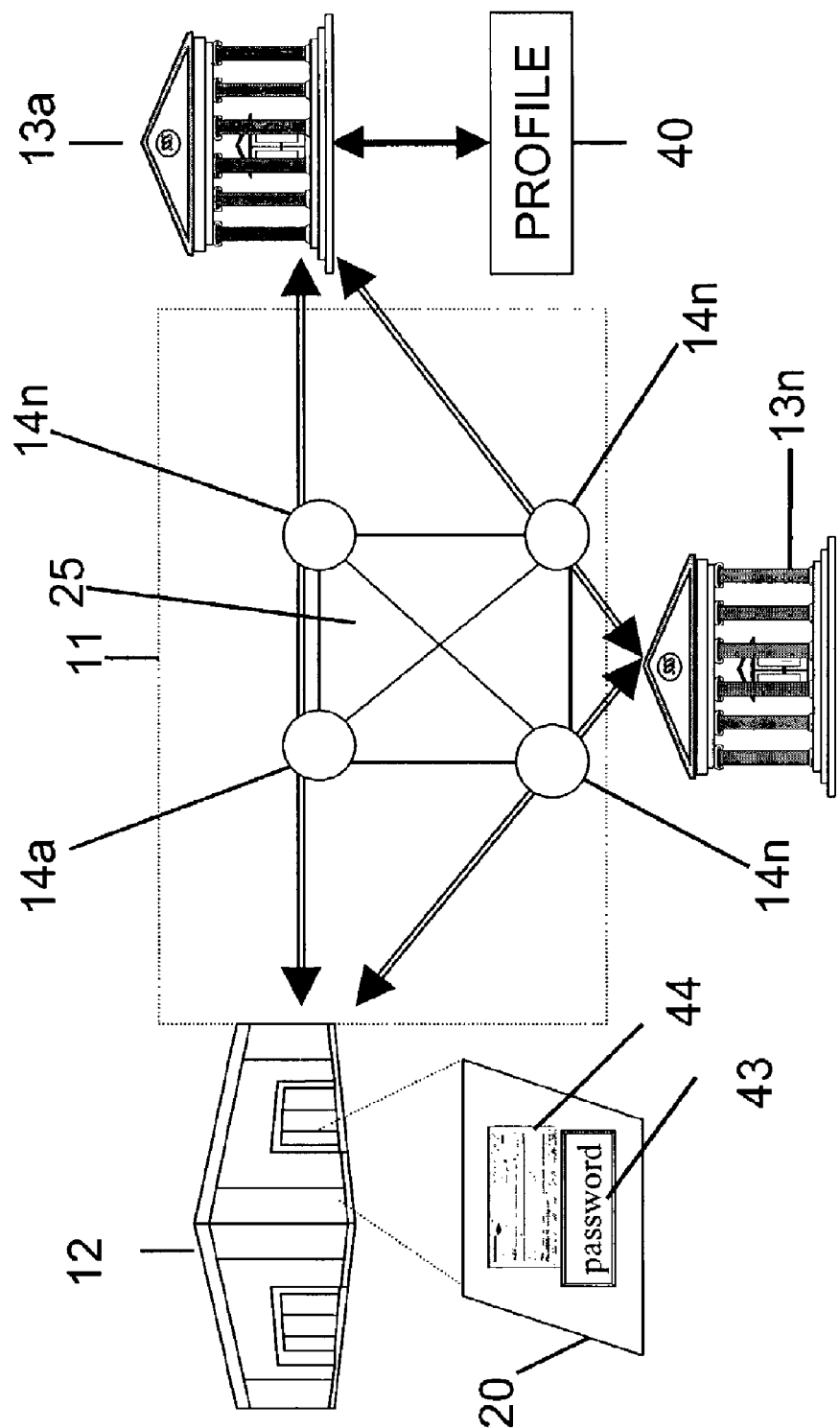
FIG. 4 is a schematic overview of a check settlement embodiment of the invention.

FIG. 4 shows an embodiment of the invention for the secure processing of documents. The process is initiated at a channel 12, such as a point of service or transaction from a purchaser to a merchant, capturing certain information, such as a dollar value amount from the purchaser and a purchaser-supplied credential 43 for authorization and/or authentication. Further access control may be applied based on user-to-account (in the case of on behalf of), owner to account, account-to-account relationship, and service provider and requestor to user relationship rules.

The channel 12, which is either trusted or has undergone a credential authentication or session key validation, is linked through a network 11 linked to the system of the invention. The message 20, which includes information captured at the point of service and level of service requested, may require translation by an adapter 14 linked to the processor 25, which is further linked to at least one destination 13 such, as in the embodiment, the institution holding the account of the purchaser.

In the preferred embodiment, an adapter 14 converts any message 20 transmitted in a non-standardized language to an XML message 24. The adapter 14 then routes the translated message to the processor 25, which decodes the message, confirm the user, and determines a determinate, used to determine the destination 13a-n of the request. The processor 25 forwards the message to a destination 13a-n that can respond to the request made from the channel 12. An adapter 14a-n linked to the processor 25 and the network 11 may be used to translate the message into a format recognized by the destination 13a-n. The adapter 14a-n adapts the message 20 to an acceptable format that will allow the destination 13a-n to respond to the request of the message, and then forwards the message to the destination 13. The destination 13 determines if the request of the message is available to the user through comparison of information contained in the message to a preexisting service profile 40 (as shown in FIG. 4) for that user. The service profile 40 in the checking embodiment includes, but is not limited to, account validation, funds availability, verify against positive pay files, evaluate for propensity for fraud, and the like.

The destination 13 evaluates the request of the message and sends a resultant response. An adapter 14a-n may be used to translate the destination's response into a suitable language (such as an XML message in the preferred embodiment), and routes the response to the processor 25. The processor 25 decodes the response, determines routing, and returns the response to the channel 12 (an adapter 14a-n may be used for translating to the proper format).

Referring to FIG. 4, a validated merchant using an embodiment of the invention captures account information 44 from a purchaser at the point of sale 12. The purchaser supplies a credential 43, such as a password. The merchant transmits the information through a network 11.

The message 20, if in a non-standardized language, is translated into a normalized language. Based on the information in the message 20, the purchaser's financial institution is determined and the request of the message is transmitted, using an adapter to translate to a recognizable format if required. The purchaser's financial institution performs the request of the message, such as determining whether the purchaser has a valid account with sufficient funds. The sufficiency of the funds is a specific amount associated with a transaction between the merchant and the purchaser. Upon confirmation of the account and funds, the purchaser's financial institution sends an approval message. The approval message is stored and forwarded to the merchant's point of sale (an adapter may be employed if necessary). Prior to transmission, the system may perform an alert look-up. Alerts include, but are not limited to informational updates, fraud alerts, loyalty points, coupons and the like. Using the invention, a provider is able to confirm in near real-time that a purchaser has a valid account.

Optionally, the stored approval messages may be posted at a predetermined time interval. The purchaser's account is debited by, and a corresponding amount is credited to the merchant's account at the merchant's financial institution (adapters may be employed if necessary). The system logs each settlement transaction and is capable of generating reports.

Figure 5:
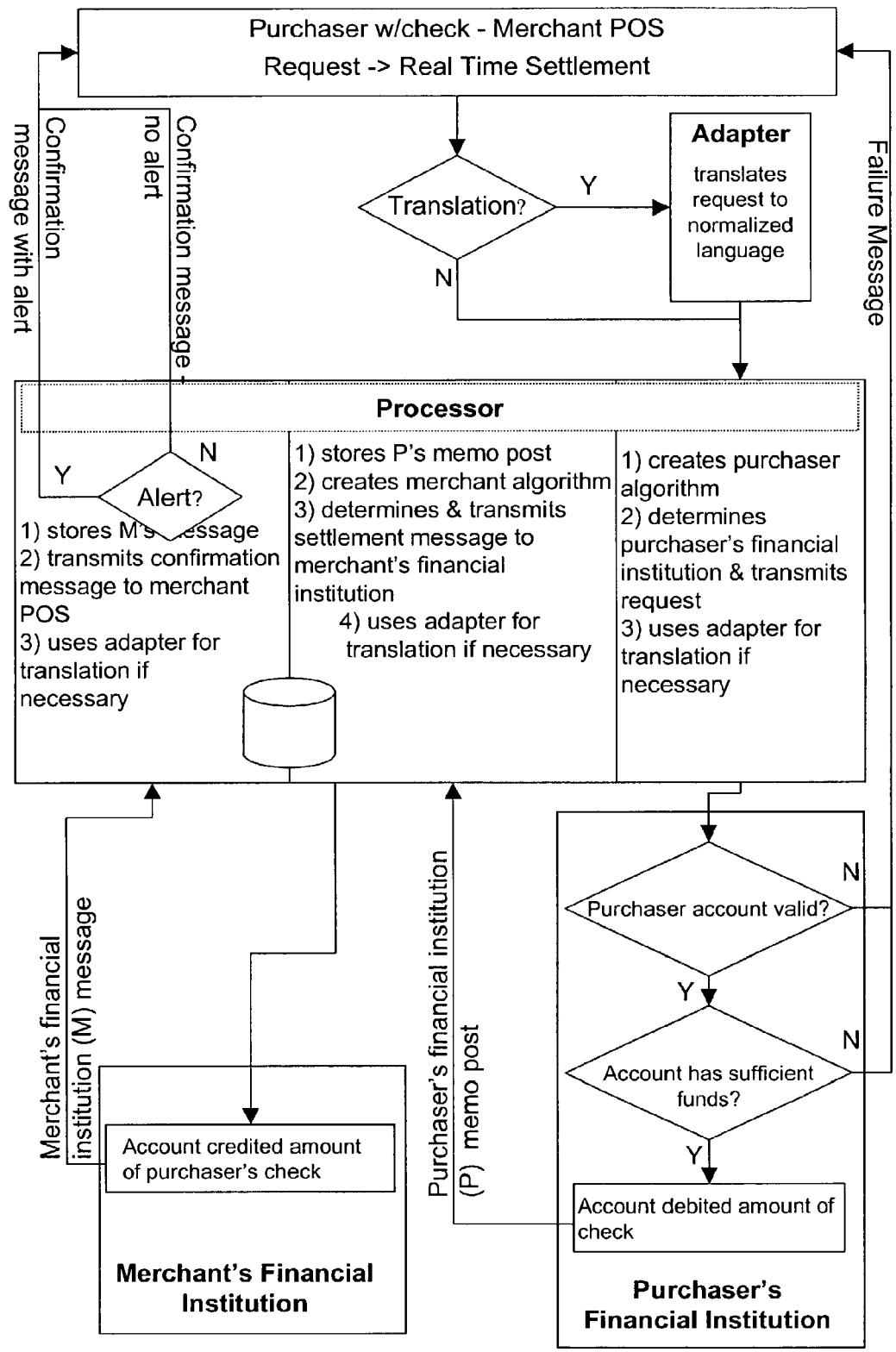
FIG. 5 is a flowchart of an embodiment of the invention where a merchant may determine sufficiency of funds in a purchaser's account.
Figure 6:
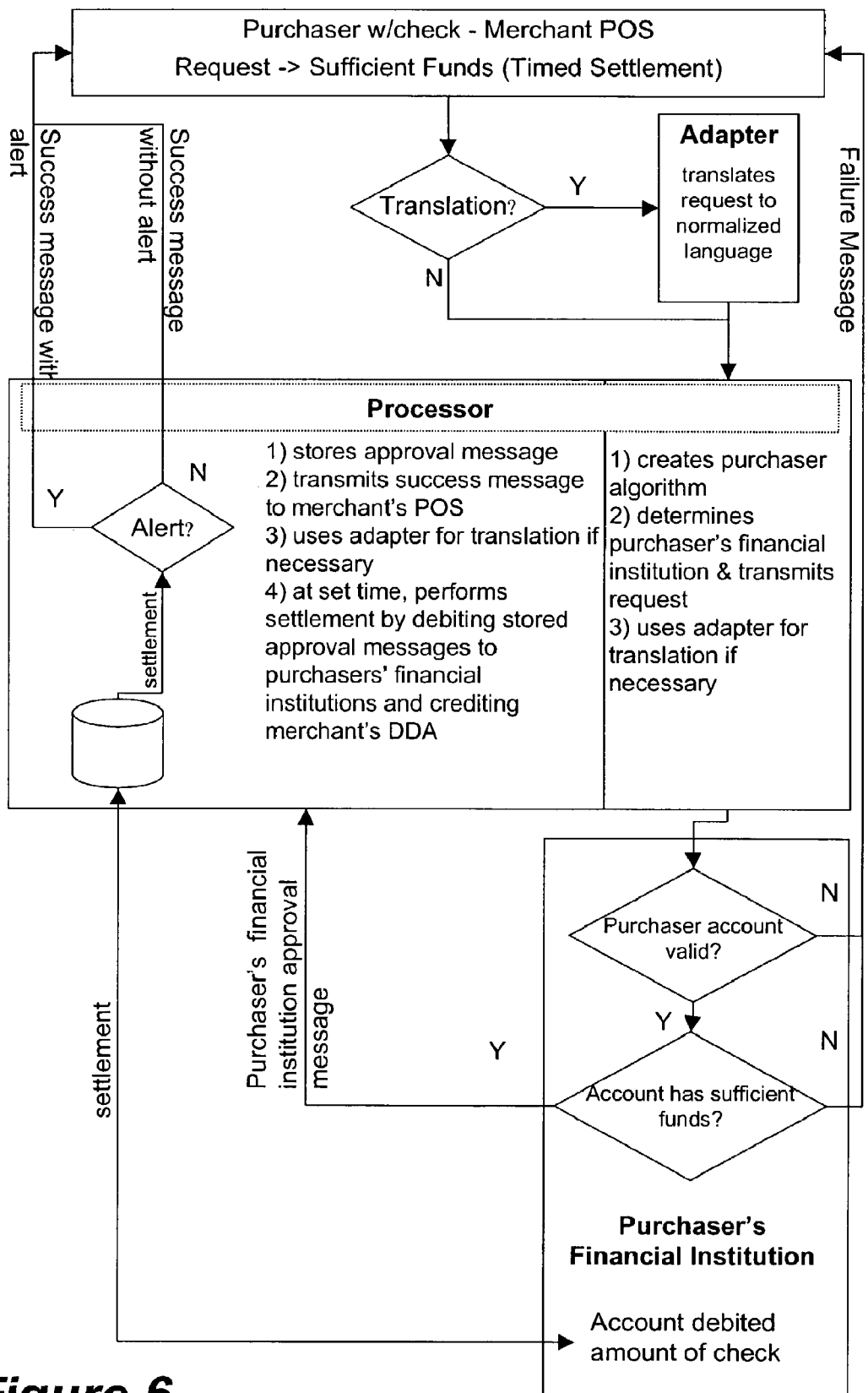
FIG. 6 is a flowchart of a check settlement embodiment of the invention.

The message 20 from a channel 12a-n may include additional information or requests, such as an authorization. As shown in FIGS. 4, 5 and 6, additional embodiments of the invention, the request is an authorization for settlement, such as that associated with a check transaction to a merchant. In this embodiment, the message 20 includes information specific to the channel 12, such as a merchant's financial institution, account number, etc. that associates a channel with a destination 13a-n linked to the system. The destination associated with the channel and the destination of the purchaser may be the same 13a or different 13n. As shown in FIGS. 5 and 6, the pre-validated merchant transmits the information through a network. The message may be translated, if necessary, into a normalized language. The invention determines and executes a determinate based on the message, and determines the purchaser's and provider's institutions from the determinate. The request of the message is transmitted, using an adapter to translate to a recognizable format if required.

The purchaser's institution executes the request of the message, such as determining whether the purchaser has a valid account. Upon confirmation of the account, a signal is transmitted effecting the transaction. A confirmation is transmitted to the provider, which may include an alert, may use an adapter if required, and may be printed. The transaction is completed in accordance to the content of the message. Records of the transactions are created and posted to a log file, which may be used to generate reports.

Figure 9:
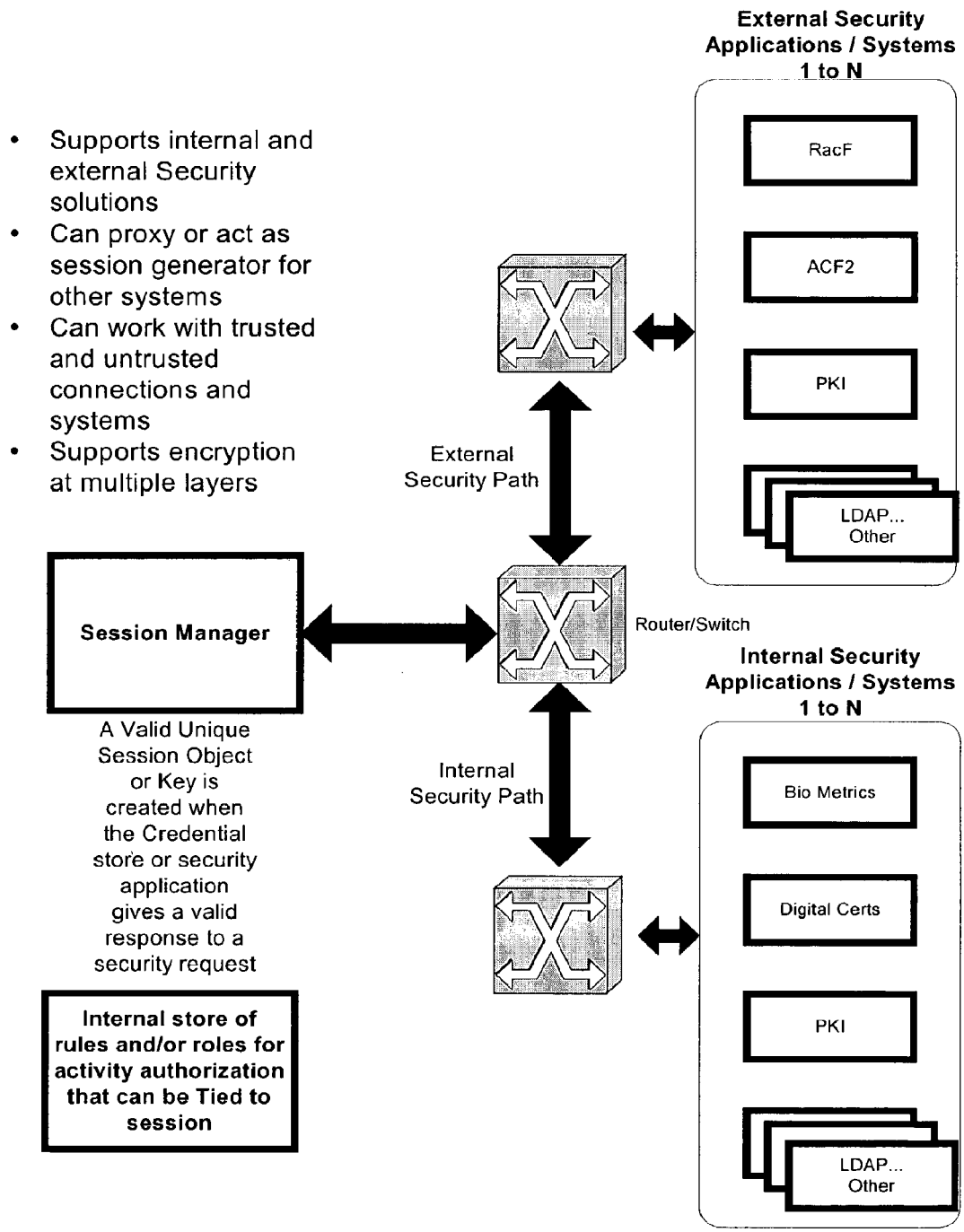
FIG. 9 is an overall schematic of the interaction of the system with external security systems to access security management applications.

FIG. 9 is an overall schematic of the interaction of the system with external security systems to access security management applications such as Resource Access Control Facility (RacF), Access Control Facility (ACF2), Public Key Infrastructure (PKI), Lightweight Directory Access Protocol (LDAP), and others; and/or internal security systems to access applications such as biometrics, digital certificates, PKI, LDAP, and others. As shown in FIG. 9, the system uses a session manager to, in part, support the internal and external security solutions; proxy or act as session generator for other systems; work with trusted and untrusted connections and systems; and support encryption at multiple layers. A valid unique session object or key is created when a credential store or security application gives a valid response to a security request. The system may also include an internal store of rules and roles for activity authorization that may be accessed and tied to the session.

Figure 10:
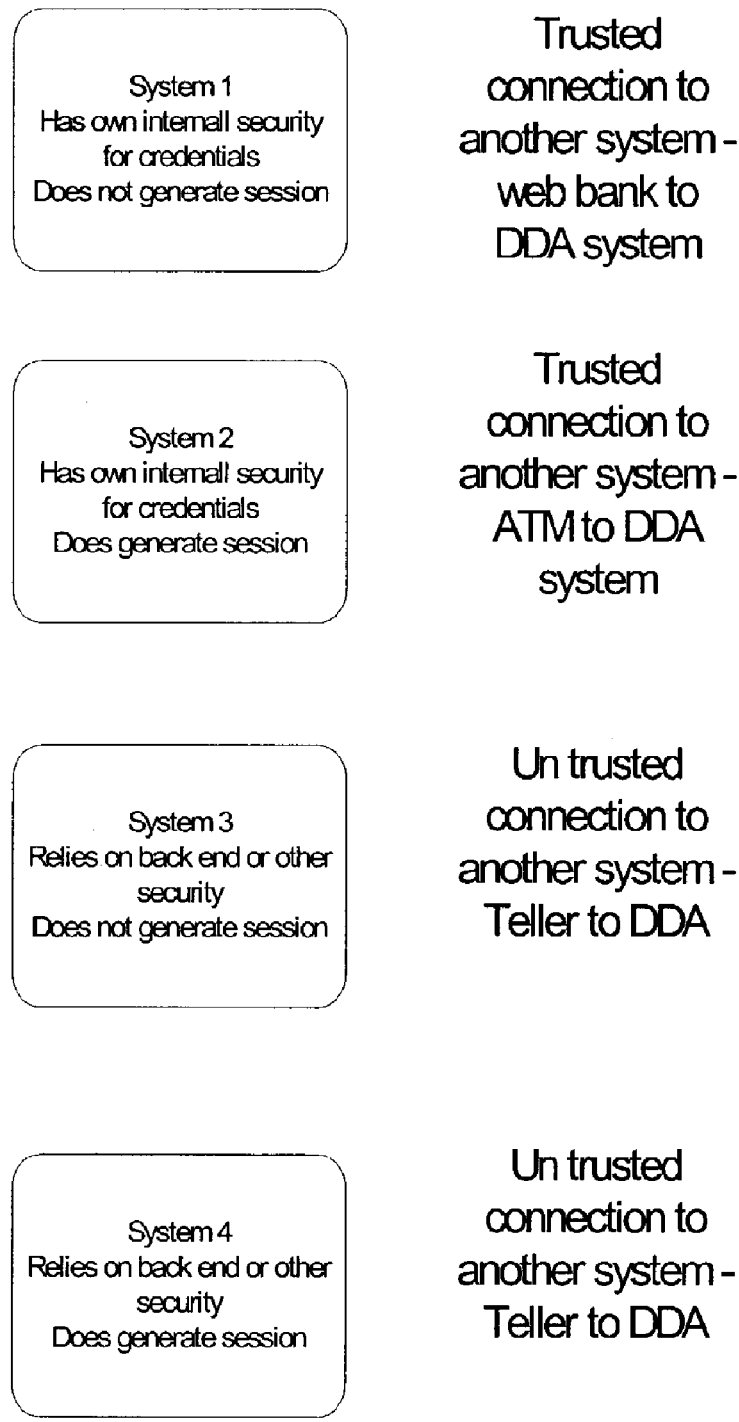
FIG. 10 shows options using the system in differing sample applications.

FIG. 10 depicts variations of the present invention. In System 1, the embodiment comprises a trusted connection to another system, such as a web bank to a demand deposit account (DDA) system. In this embodiment, the system has internal security applications for credentials and no session is generated. In system 2, the embodiment comprises a trusted connection to another system, such as an ATM to a DDA. In this embodiment, the system has internal security applications for credentials and a session is generated. In System 3, the embodiment comprises an un-trusted connection to another system, such as a teller to a DDA. In this embodiment, the system relies on back end or other security applications for credentials and no session is generated. In System 4, the embodiment comprises an un-trusted connection to another system, such as a teller to a DDA. In this embodiment, the system relies on back end or other security applications for credentials and a session is generated. Processes that may be defined for instruments include verification, identification and/or authentication, authorization, review, 5) imaging, 6) reports and 7) archiving.

The system can communicate with a variety of services, including Lightweight Directory Access Protocol (LDAP), Core Systems, Resource Access Control Facility (RACF), Access Control Facility (ACF2), web data centers, UNIX systems, and the like. The present invention integrates with existing channel authentication and authorization mechanisms and credentialing types. The system may employ existing credentials, such as those issued for terminals, web sites, voice recognition units (VRU), devices used to connect to a mainframe (3270), etc., or establish new ones. The system is capable of using existing authentication systems, such as RACF, ACF2, channel applications, device algorithms, LDAP, Public Key Infrastructure (PKI), etc. A user may use existing credential management processes and procedures or establish new processes depending on the device, user, request and service being supported. Unique information distinguishing the user and/or device within one or more typical channel systems are listed in the following Table III:

TABLE III

| | |
|---|---|
| Terminal: | Terminal ID + Card Number |
| Representative: | Terminal ID + Teller ID (+ Account #/Customer #) |
| VRU: | VRU Terminal ID + Port # |
| Call Center: | Station ID + Agent ID (+ Account #/Customer #) |
| Platform: | Terminal ID + Officer ID (+ Account #/Customer #) |
| Web: | Session Cookie Value |

The use of the present invention for authentication/authorization in secure transactions allows for convenience and flexibility. The invention provides for trusted and untrusted connections and can handle many types of credentials and other types of access control mechanisms. The system is easily extended to handle new connections and credential types. The present invention invokes the corresponding authentication and/or authorization procedure and system based on the type of channel, application, user role, connection type, service requested, credential type, etc., and can implement access control policies based on the criteria linked to a channel, device, service, user(s), institutions, and service requests. The present invention handles session management across channels and has the ability to proxy session for those interfaces capable of sharing a session key. This eases integration of existing systems and supports new channel integration while insuring consistent activity auditing and reporting, and enables participants to complete transactions through existing technologies, such as a web browser, in real-time or in a batch process. The system includes technology to authenticate and authorize transactions and enable the secure exchange of settlement-related documents.

An interface is provided that allows multi-credential, multi-service, multi-role, and multi-channel based routing to multiple authorization and authentication providers independent of the location of the credential, language or dialect used by the channel. The use of such an interface provides for the creation of a framework to enable entities to communicate and perform transactions instantly or nearly instantly, and seamlessly with and without prior knowledge of the transacting agent, such as requiring additional passwords or other security objects for separate services.

In addition, the system allows for data persistence, in the storage of information internal to the system. By allowing for application logic across incompatible systems, the invention can universally update information, such as a change of address of a user. The universal update feature of the invention eliminates the need for mass mailings to users for updates in the transfer to new systems.

In addition to internal aggregation to a bank or financial services company, the invention also allows for the integration of services and systems across company and geographic boundaries. Integration of services (networks) allows all banks that are connected to the invention to share services and products in a fashion that is seamless to the customer. Seamless integration is accomplished by the nature of the system having the ability to securely communicate among the many systems connected to it. The integration system is independent of network ownership and location. By the nature of the interface, the message and the service requested, the system can process the decision to service a request in real time based on the knowledge of all of the other interconnected systems. Aggregation across company boundaries, geographical boundaries, and company or business entities results.

In an information model, the following are examples of accessible and changeable data within a range of personal and enterprise and public and innocuous to extremely confidential and sensitive (in no particular order): personal information, user credentials, solicitation preference, personal information, income and income sources, accounts, liabilities, insurance, education and employment data, reference data, credit information, employment information, customer (involved party) interactions, in-bound and out-bound interactions, and multiple events per interaction. In legacy systems, the information may be in different dialects on different data stores in different locations. In one model, information in disparate networks is useful for product solicitations and determinations such as insurance, property, casualty, life, disability, and health.

Similarly, criteria related to a customer may include behavioral information, customer profitability, product profitability, customer behavioral, customer wallet-share, customer attrition, channel efficiencies, sales and offers, product profitability, channel, and channel efficiencies. On the enterprise level, information and activity categories include control, enterprise security and authentication, session management, system processing, journaling, application parameters, adapter meta data, error and event logging, product catalog, organizational structure, employees and employee roles, regulatory information, Patriot Act, Fair Credit Reporting Act, HIPAA, and Graham-Leach-Bliley Act.

An aggregator, interaction manager is provided for business management routines (business rules) which centralize business rules in order to facilitate their consistent application across the disparate networks and systems of the enterprise. The system insures appropriate processing sequence, enables maximum flexibility, allows business rules to be independent of system implementation, facilitates data management routines (data access), separates data access from the physical data storage mechanism, enables portability among market leading database management products, functions as integration point for universal adapter to core processing systems, enforces consistent use of information, ensures accuracy and integrity, and provides model management. The system benefits include an isolation of data access from business logic enabling flexibility in implementation, consistent representation of information across the enterprise, the elimination of dependence on unrelated or unreliable systems through data persistence, support for transactional processing as well as decision support, and insure consistent application of business rules across the enterprise through reusable business functions.

Enterprise configurable objects manageable by the system include the grouping of functions and messages to fulfill a customer experience and a pre-built reusable library of messages. The system is configurable to support all customer interactions at all delivery channels for a truly enterprise-wide solutions and supports customer analysis for more informed service, provides a single comprehensive, proactive view of the customer, and enables consistency in sales and service approach. Enterprise configurable object categories with which the system may be used include, but are not limited to: sales and cross sales, customer inquiry, customer services, customer change, customer issue resolution, information request, customer notification, institution initiated, new account opening, next likely sale, offer complementary services, customer needs analysis, complete customer profile, planning, insurance analysis, statement cycle date, account information, balance, amount, payment information, year end statement summary, obtain a copy of transaction receipt, etc.), electronic bill payment, account aggregation, name changes, address maintenance, phone numbers, e-mail, demographic information maintenance, PIN maintenance, username maintenance, marketing solicit/do not solicit, alerts by product, alerts by channel, account owner maintenance, timing of statement, statement address, time deposit interest payment allocation, accounts linked to terminals, select PIN, accounts linked on combined statement, dispute transaction, dispute transaction amount, product features (fees, bundles, etc.), product disclosures, product availability (location, etc.), branch products and services available, branch locations/addresses, branch hours, branch phone numbers, terminal features and locations, customer maintenance, etc. Each category differs in relative value, sensitivity, customer and enterprise relationship, need to know, change authorization criteria, and other practical factors in an enterprise activity concerning a relationship in which the who, where (source) and activity criteria are interrelated and determine identity, authorization and access to an activity. Thus, the system is a flexible application of business components to address institutional needs allowing incremental implementation of components enabling a focus on high priority needs, in which new functionality can be introduced quickly and without impact to existing systems.

The physical platform configuration benefits permit vertical and horizontal scalability flexible communication options, noninvasive integration to existing systems, and high availability. Among the platforms supported are IBM OS390 Parallel Sysplex, AIX, Linux, Solaris, Database, DB2/UDB, Oracle, Preferred J2EE Application Server, WebSphere, Enterprise Integration, J2EE Within Our Product, MQ For External Connectivity, and others. The system employs a standardized message architecture; the store and forward processing of messages maximizes throughput and scalability; messages provide a convenient unit of translation between disparate protocol vocabularies; the many-to-one (any to hub IFX) messaging vocabulary minimizes integration effort and provides standardization content-based routing allowing multiple service providers to be integrated into a single service and a seamless experience for the customer. IFX provides an open standard, eliminating the need for a second message layer, leverages multiple industry players for best-of-breed solutions, provides a robust message set, meshes nicely with XML, and is extensible in a predefined process.

In a processing scenario, a port object accepts a message in the delivery channel's native format, a translator leverages meta data repository to convert into IFX format, each message is verified against the session cache and user authenticated if necessary. A universal adapter translates IFX into core processing system format. The object port sends the message to the appropriate system. FIG. 7 shows a message example including the parameters: the name of the request (the sign on request occurs in every IFX document), the name of a request component (called an aggregate in IFX), and an element of the request containing data. The aggregates and elements of a request are standardized so that applications may depend on specific semantic requirements always being present. Business requests are qualified into service groupings (Not all possible service grouping are required, but if a grouping is offered then all messages of the group must be implemented.) and the name of a business request within a service. Each interaction is logged. The object processor provides load balancing, fail over, recovery, transaction processing and message routing. The interaction manager leverages the service directory to dynamically invoke all of the appropriate business management routines. Each business management routine can execute in parallel. The interaction manager leverages the service directory to dynamically invoke the appropriate data management routines. The data management routines can access the unified information model or the core processing system data.

The advantages of the dialect normalized system of the invention, in comparison with a point to point system for interfacing systems, networks or services as shown in FIG. 8, may be estimated mathematically. The number of unique interfaces X (number of interfaces required) that must be defined and maintained in a traditional point to point approach is determined by the formula X=Sum(N−1) where N−>1 in which N=# of systems. In the normalized system herein, the number of interfaces X equals the number of systems, namely, X=# of systems/interfaces in the environment. Table IV below provides an example of the impact of the present system:

TABLE IV

| NUMBER OF SYSTEMS N | NUMBER OF INTERFACES REQUIRED IN A POINT TO POINT SYSTEM X = Sum (N − 1) | NUMBER OF INTERFACES REQUIRED USING THE SYSTEM OF THE INVENTION X = N | INTERFACE SAVINGS ACHIEVED WITH THE NORMALIZED SYSTEM |
| --- | --- | --- | --- |
| 4  | 6   | 4  | 2   |
| 6  | 15  | 6  | 9   |
| 10 | 45  | 10 | 35  |
| 20 | 190 | 20 | 170 |

The number of interfaces via the traditional point to point approach grows significantly as the environment grows. In the system described, the interfaces are reduced, providing advantages in maintenance of the environment as well as the cost of implementing changes. The benefits are available with a normalized approach in which adapters enable the system in existing environments.

The present invention also lends itself to nonfinancial applications. Using the system of the invention, a particular user's identification information may be compared to any given information, such as that included in a "hot file," for example, closed or overdrawn accounts, or identities compiled in connection with the Patriot's Act, and the like. The present invention allows for tracing of any interaction, the collection of that information associated with that interaction and the transmission of that information to a given destination and the generation of reports. Using the alert feature of the invention, a teller at a window in a bank may be warned that the name of the person attempting to open a new account, or that the account being accessed is listed in a database of known bad actors.

The commercial applicability of the present invention is relative to transactions or requests and responses between and among and to and from users, such as senders and recipients and watchers or third party security functions, for example, in non-repudiation modes. Typically, an exchange will occur between connecting parties and/or machines and/or sessions, however, the invention is capable of translating a single request or response for use by other systems.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described.

What is claimed is:

1. A system providing standardized transmission of data between and among digital devices using a single sign-on from a user comprising:

a digital device adapter to provide an interface to the user and a provider, the provider non-affiliated with the user, said adapter providing standardized transmission with trusted and untrusted connections by translating either or both of a non-native request and/or a non-native response to and from a normalized format or to a format needed for processing the request and/or response, the request comprising a service with a customer of the user, said customer affiliated with the provider and further comprising:

formatting an electronic request by translating data contained in the request, said request transmitted from the user;

preserving a communication infrastructure of the user;

producing an object recognizable by the provider;

automatically building one or more connection for one or more platform used by the user to communicate with the platform of the non-affiliated user;

transmitting at least one of one or more request and one or more response generating a session;

creating a map of the session;

generating at least one unique identifier for each request and response;

logging the identifiers;

generating one or more unique session object, said object associated with the user and comprising a translation of the request for sending to the affiliated provider, said object facilitating switching from one or more than one application based on the request, wherein data is translated into an object that can be sent between non-affiliated groups; and creating one or more file selected from a group consisting of a log, a journal, and an error report based on the object, such that, if accepted, a transaction in response to the request is made in real time.

2. The system of claim 1 wherein the system securely integrates multiple disparate applications that may or may not be controlled or owned by the same entity through the exposure of normalized services that provide access to business functions residing in disparate systems including:

one or more internet protocol packet switched networks;

an adapter associated with each user and each provider that acts as a secure on ramp and integration point to the secure network wherein the adapter comprises a digital processor for providing:

a communication protocol that provides a delivery channel that communicates via a different protocol to communicate with the network platform;

a proxy for the channel device enabling a channel device to be integrated into the environment without changing the device's communication infrastructure; a translation mechanism to convert channel specific syntax and encoding to and from a format understood by a destination of the data such that a channel device is integrated into the environment without changing the native data representations and encoding used;

a family of services that are accessed through the secure network via a normalized format that may be owned or created by any participant connected to the network and offered to users of the network; and a unique identifier assigned to each and every interaction with the network that is unique and specific to the entry and exit points for a request into and out of the network allowing end to end tracking and security for all interactions with the network.

3. The system of claim 1 wherein the adapter creates one or more file selected from the group consisting of a log, a journal, and an error report based on the object.

4. The system of claim 1 wherein no user has access to the object of another user.

5. The system of claim 1 configured in hub and spoke, star, direct, peer to peer or hybrid connections to allow multiple communication configurations between participants connected via an adapter.

6. The system of claim 1 wherein a user generates a connection ID if an external system does not generate one, the adapter using said connection ID to proxy the session to one or more second user.

7. The system of claim 1 wherein the adapter uses the object to validate one or more than one subsequent interaction with a device associated with the user or an interface point.

8. The system of claim 7 wherein the validation determines one or more than one level of authorization.

9. The system of claim 1 wherein the adapter manages authorization for one or more than one user, device, request, interface, and response.

10. The system of claim 1 wherein the adapter caches the object.

11. The system of claim 1 wherein the adapter stores one or more object in a central location to support fail over.

12. The system of claim 10 wherein the cache or store comprises information concerning role and/or one or more rule associated with the session.

13. The system of claim 1 wherein the adapter links one or more session to manage the dialog of the session off line.

14. The system of claim 1 wherein the adapter interfaces between providers and trusted and/or untrusted users and comprises one or more than one function of authorization, authentication, secure communications, and non-repudiation.

15. The system of claim 1 wherein translation occurs between and among 1) a request being made, 2) a device the request is being made from, 3) an owner of the device making the request, 4) an agent device, service provider or infrastructure making the request, 5) a credential and/or a security element presented, and 6) the service provider and/or owner of the system or systems containing the information of record for the request.

16. The system of claim 1 wherein the security management application is one or more than one of a biometrics, a digital certificate, a PKI, an LDAP, and a smart card.

17. A system providing standardized point to point transmission of data between and among digital devices using a single sign-on from a user wherein the system securely integrates multiple disparate applications that may or may not be controlled or owned by a same entity through the exposure of normalized services that provide access to business functions residing in disparate systems including:

one or more internet protocol packet switched networks;

an adapter associated with each user and each provider that acts as a secure on ramp and integration point to the secure network wherein the adapter comprises a digital processor for providing:

a communication protocol that provides a delivery channel that communicates via a different protocol to communicate with the network platform;

a proxy for the channel device enabling a channel device to be integrated into the environment without changing the device's communication infrastructure;

a translation mechanism to convert channel specific syntax and encoding to and from a format compliant to that of a destination of the data such that a channel device is integrated into the environment without changing the native data representations and encoding used;

a family of services that are accessed through the secure network via a normalized format that may be owned or created by any participant connected to the network and offered to users of the network; and a unique identifier assigned to each and every interaction with the network that is unique and specific to the entry and exit points for a request into and out of the network allowing end to end tracking and security for all interactions with the network; wherein the adapter provides an interface to one or more user and a provider of digital services, said adapter providing standardized transmission with trusted and untrusted connections by translating either or both of a non-native request and/or a non-native response to the request to and from a normalized format or to a format needed for processing the request and/or response and 1) formats an electronic request by translating data contained in a request transmitted from one or more user; 2) preserves a communication infrastructure of the user; 3) produces an object recognizable by one or more platform of one or more non-affiliated user; 4) builds one or more connection for one or more platform used by the user to communicate with the platform of the non-affiliated user; 5) transmits at least one of one or more request and one or more response; 6) generates a session; 7) creates a map of the session; 8) generates one or more unique session object associated with the user and comprising a translation of the request for sending to the affiliated provider, said object facilitating switching from one or more than one application based on the request, wherein data is translated into an object that ca be sent between non-affiliated groups; and 9) maintains a log of activity occurring with respect to all interactions within the network, such that, if accepted, a transaction in response to the request is made in real time.

18. The system of claim 17 configured in hub and spoke, star, direct, peer to peer or hybrid connections to allow multiple communication configurations between participants connected via an adapter.

19. The system of claim 17 wherein translation occurs between and among 1) a request being made, 2) a device the request is being made from, 3) an owner of the device making the request, 4) an agent device, service provider or infrastructure making the request, 5) a credential and/or a security element presented, and 6) the service provider and/or owner of the system or systems containing the information of record for the request.

20. The system of claim 17 including a security management application comprising one or more than one of a biometrics, a digital certificate, a PKI, an LDAP, and a smart card.

* * * * *